(12) United States Patent
Chen et al.

(10) Patent No.: US 11,283,130 B2
(45) Date of Patent: Mar. 22, 2022

(54) BATTERY BOX

(71) Applicant: CONTEMPORARY AMPEREX TECHNOLOGY CO., LIMITED, Ningde (CN)

(72) Inventors: Tianming Chen, Ningde (CN); Zhiming Chen, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 327 days.

(21) Appl. No.: 16/673,553

(22) Filed: Nov. 4, 2019

(65) Prior Publication Data

US 2020/0212392 A1 Jul. 2, 2020

(30) Foreign Application Priority Data

Dec. 29, 2018 (CN) .......................... 201811630123.8

(51) Int. Cl.
*H01M 50/20* (2021.01)
*B60R 16/04* (2006.01)

(52) U.S. Cl.
CPC ............. *H01M 50/20* (2021.01); *B60R 16/04* (2013.01); *H01M 2220/20* (2013.01)

(58) Field of Classification Search
None
See application file for complete search history.

(56) References Cited

U.S. PATENT DOCUMENTS

2010/0136413 A1 6/2010 Hermann et al.
2018/0212222 A1* 7/2018 Barton ............... H01M 50/3425

FOREIGN PATENT DOCUMENTS

CN 105762316 A 7/2016
CN 208622878 U 3/2019
(Continued)

OTHER PUBLICATIONS

Contemporary Amperex Technology Co., Limited, First Office Action, CN201811630123.8, dated Aug. 21, 2020, 7 pgs.
(Continued)

*Primary Examiner* — Wyatt P McConnell
(74) *Attorney, Agent, or Firm* — Morgan, Lewis & Bockius LLP

(57) ABSTRACT

The present disclosure provides a battery box, the battery box comprises a box body, batteries, an insulating film and a adhesive. Each battery comprises a case. The insulating film covers the case of each battery and is provided with an opening. The adhesive is provided between the battery and the box body. The $A_1$, A, $L_1$, $\rho_1$, $L_2$ and $\rho_2$ meet a following relationship:

$$\frac{\frac{L_1}{A_1} \cdot \rho_1 \cdot \frac{L_2}{A-A_1} \cdot \rho_2}{\frac{L_1}{A_1} \cdot \rho_1 + \frac{L_2}{A-A_1} \cdot \rho_2} \geq 10 \text{ M}\Omega.$$

Because the insulating film is provided with the opening, a portion of the adhesive bonds the case to the box body at the opening, a portion of the adhesive bonds the insulating film to the box body at the outside of the opening, it ensures the bonding strength between the battery and the box body. Meanwhile, it makes a covering area of the insulating film on the battery meet the requirement of the insulating strength, thereby ensuring the safety performance.

20 Claims, 2 Drawing Sheets

(56) References Cited

FOREIGN PATENT DOCUMENTS

| DE | 102013204670 B3 | 5/2014 |
|---|---|---|
| DE | 102014211821 A1 | 12/2015 |

OTHER PUBLICATIONS

Contemporary Amperex Technology Co., Limited, Extended European Search Report EP19207854.1, dated Apr. 24, 2020, 7 pgs.

* cited by examiner

BATTERY BOX

CROSS-REFERENCE TO RELATED APPLICATIONS

The present application claims priority to Chinese patent application No. CN201811630123.8, filed on Dec. 29, 2018, which is incorporated herein by reference in its entirety.

FIELD OF THE PRESENT DISCLOSURE

The present disclosure relates to the field of battery technology, and particularly relates to a battery box and a vehicle.

BACKGROUND OF THE PRESENT DISCLOSURE

At present, in many battery boxes, the bottom of the battery is directly fixed on the lower box body of the battery box by the manner of bonding. Because the lower box body and the case of the battery are usually made of metal (such as aluminum), and in order to insulate the case of the battery, an insulating film generally covers the case.

Because the insulating film is usually made of a high polymer material such as PET, PC etc., and the surface energy of these high polymer materials are relatively lower, when the lower box body is bonded to the insulating film outside of the case of the battery by the adhesive, the bonding effect is not good. Because the bonding effect between the adhesive and the aluminum is better than the bonding effect between the adhesive and the insulating film, in order to improve the bonding effect, a part of the insulating film at the whole bottom of the battery is usually completely removed, therefore the adhesive bonds the whole bottom of the case of the battery to the lower box body. Although this arrangement ensures the bonding strength of the battery box, the safety problem due to the insufficient insulation strength of the battery box often occurs in the long-term use of the battery box.

SUMMARY OF THE PRESENT DISCLOSURE

In view of the problem existing in the background, an object of the present disclosure is to provide a battery box and a vehicle, the battery box ensures the bonding strength of the battery box, meanwhile improves the insulation performance of the battery box, in turn effectively ensures the safety performance of the battery box.

In order to achieve the above object, in a first aspect, the present disclosure provides a battery box, which comprises a box body, a plurality of batteries, an insulating film and an adhesive. The plurality of batteries is arranged side by side in a longitudinal direction and accommodated in the box body, and each battery comprises a case. The insulating film covers and is fixed to an outside of the case of each battery, and an opening is provided on the insulating film to make a corresponding portion of the case expose to the insulating film. The adhesive is provided between the battery and the box body and used to fix each battery to the box body. An area of the opening is $A_1$, a total area of a surface of the case corresponding to the opening is $A$, a thickness of the adhesive is $L_1$, a volume resistivity of the adhesive is $\rho_1$, a thickness of the insulating film is $L_2$, a volume resistivity of the insulating film is $\rho_2$, and $A_1$, $A$, $L_1$, $\rho_1$, $L_2$ and $\rho_2$ meet a following relationship:

$$\frac{\frac{L_1}{A_1} \cdot \rho_1 \cdot \frac{L_2}{A-A_1} \cdot \rho_2}{\frac{L_1}{A_1} \cdot \rho_1 + \frac{L_2}{A-A_1} \cdot \rho_2} \geq 10 \text{ M}\Omega.$$

In an embodiment, $$\frac{\frac{L_1}{A_1} \cdot \rho_1 \cdot \frac{L_2}{A-A_1} \cdot \rho_2}{\frac{L_1}{A_1} \cdot \rho_1 + \frac{L_2}{A-A_1} \cdot \rho_2} \geq 150 \text{ M}\Omega.$$

In an embodiment, $A_1$ and A need to meet the relationship: $A_1/A > 50\%$.

In an embodiment, $A_1/A \leq 70\%$.

In an embodiment, the insulating film is made of polypropylene, polycarbonate or polyethylene terephthalate, and $0.1 \times 10^{14}$ Ω·cm ≤ $\rho_2$ ≤ $2 \times 10^{14}$ Ω·cm.

In an embodiment, $0 < L_1 \leq 2$ mm. Moreover, $0 < L_2 \leq 0.15$ mm.

In an embodiment, the material of the adhesive is a one-component polyurethane or a two-component polyurethane.

In an embodiment, the material of the adhesive is a one-component epoxy resin or a two-component epoxy resin.

In an embodiment, the case of each battery comprises a bottom face. The opening is positioned below the bottom face of the case in an up-down direction and makes a part of the bottom face of the case expose to the insulating film.

In an embodiment, the case of each battery comprises a side face. The opening is positioned outside the side face of the case in a transversal direction and makes a part of the side face of the case expose to the insulating film.

In a second aspect, the present disclosure further provides a vehicle, which comprises the battery box described above.

The present disclosure has the following beneficial effects: because the insulating film is provided with the opening, a portion of the adhesive bonds the case of the battery to the box body at the opening, a portion of the adhesive bonds the insulating film to the box body at the outside of the opening, it ensures the bonding strength between the battery and the box body. Meanwhile, because A, $L_1$, $\rho_1$, $L_2$, $\rho_2$ and the area $A_1$ of the opening of the insulating film meet the above relationship, it makes a covering area of the insulating film on the battery meet the requirement of the insulating strength (that is, the insulation failure of the inside of the battery box does not occur), thereby ensuring the safety performance of the battery box.

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the term "plurality" is two or more. For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present application will be further described in detail in combination with the figures.

Figure 1:
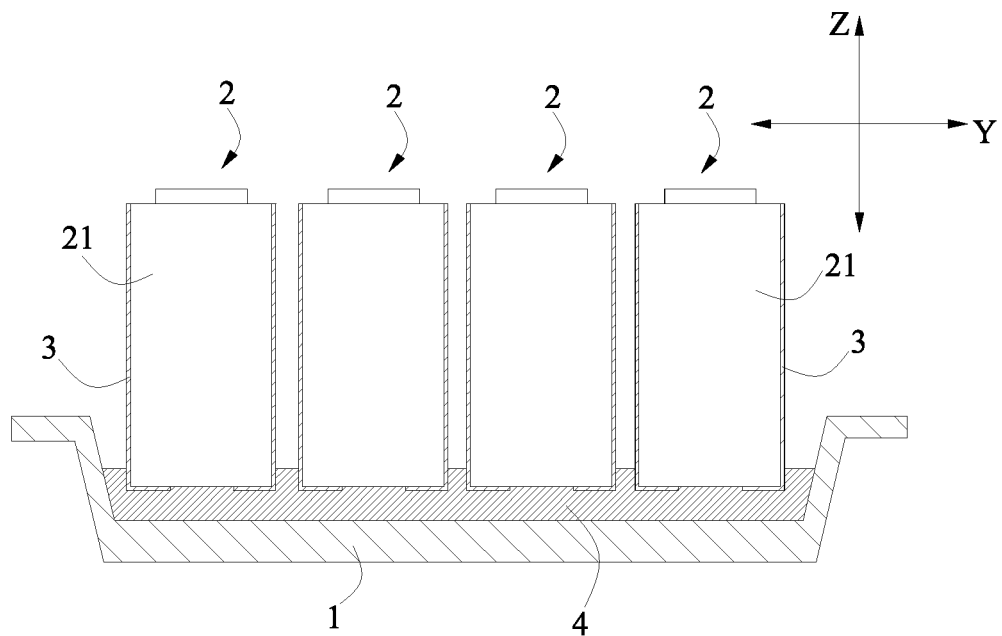
FIG. 1 is a schematic view showing the structure of a battery box of the present disclosure.

Referring to FIG. 1, a vehicle according to the present disclosure comprises a battery box, and the battery box comprises a box body 1, a plurality of batteries 2, an insulating film 3 and an adhesive 4.

The plurality of batteries 2 are arranged side by side in a longitudinal direction Y and are accommodated in the box body 1. Each battery 2 comprises a case 21, and the case 21 comprises two side faces in a transversal direction X, two large faces in the longitudinal direction Y and one bottom face in an up-down direction Z. The case 21 may be made of a metal material.

Figure 2:
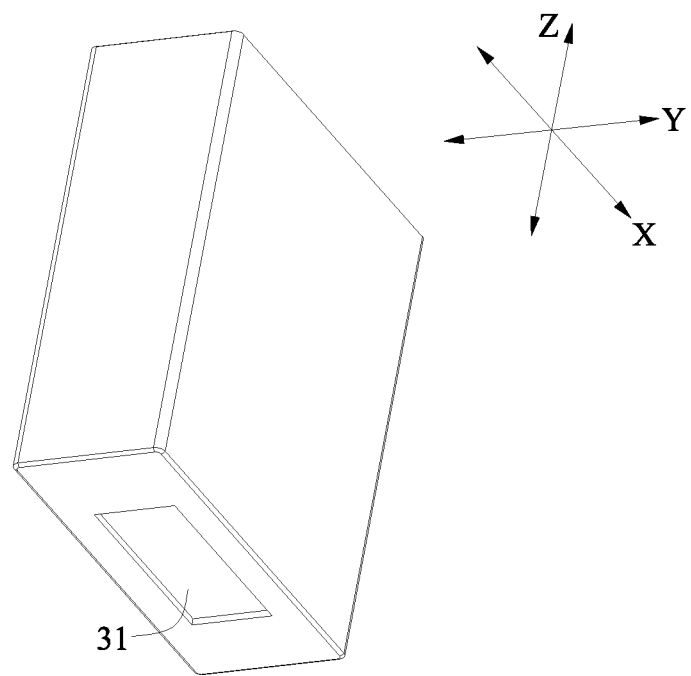
FIG. 2 is a schematic view showing a position of an opening of an insulating film and a battery of FIG. 1.
Figure 3:
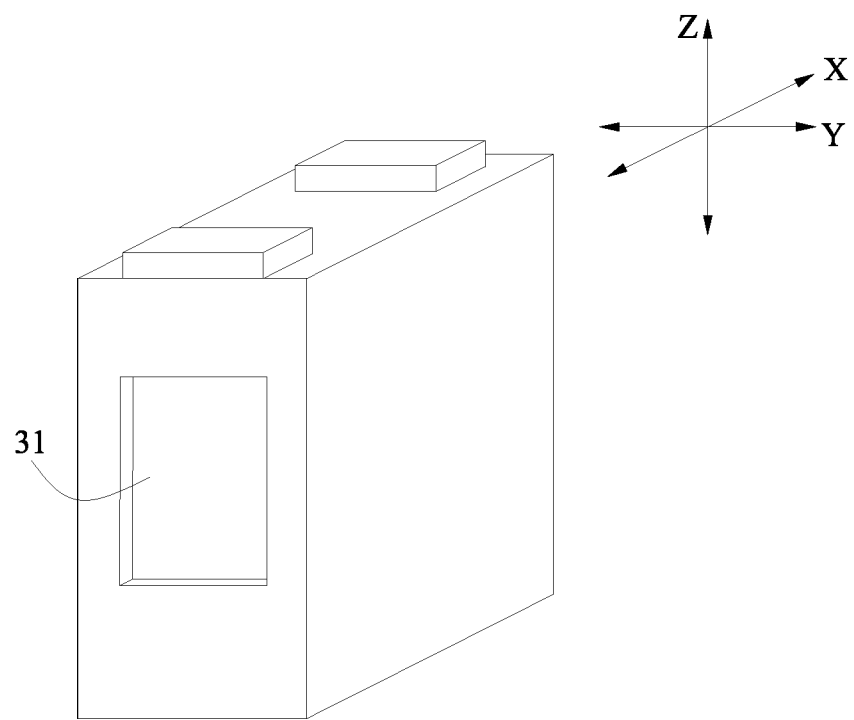
FIG. 3 is a variation of FIG. 2.
Reference numerals in figures are represented as follows:
1 box body
2 battery
21 case
3 insulating film
31 opening
4 adhesive
X transversal direction
Y longitudinal direction
Z up-down direction

A bonding binder is provided on one side of the insulating film 3 facing the battery 2, so as to make the insulating film 3 cover and bond to an outside of the case 21 of the battery 2. An opening 31 is provided on the insulating film 3, so as to make a corresponding portion of the case 21 expose to the insulating film 3. Specifically, the opening 31 may penetrate a portion of the insulating film 3 covering a bottom face of the case 21 of the battery 2 in the up-down direction Z (i.e., the opening 31 is positioned below the bottom face of the case 21), so as to make a part of the bottom face of the case 21 expose to the insulating film 3 (as shown in FIG. 2). Alternatively, the opening 31 may also penetrate a portion of the insulating film 3 covering the side face of the case 21 of the battery 2 in the transversal direction X (i.e., the opening 31 is positioned outside the side face of the case 21), so as to make a part of the side face of the case 21 expose to the insulating film 3 (as shown in FIG. 3).

The adhesive 4 is provided between the battery 2 and the box body 1 and is used to fix each battery 2 to the box body 1. After the plurality of batteries 2 are placed in the box body 1, a portion of the adhesive 4 is positioned between the insulating film 3 and the box body 1, and a portion of the adhesive 4 is positioned between the case 21 of the battery 2 and the box body 1 (i.e., the opening 31 is filled with the adhesive 4). Of course, a portion of the adhesive 4 may also be interposed between the two adjacent batteries 2.

After the battery box is assembled, the case 21 of each battery 2 is bonded to the box body 1 by the adhesive 4, and the insulating film 3 is also bonded to the box body 1 by the adhesive 4, thereby fixing each battery 2 in the box body 1.

In the battery box of the present disclosure, an area of the opening 31 of the insulating film 3 is $A_1$, a total area of a surface of the case 21 corresponding to the opening 31 is A, a thickness of the adhesive 4 is $L_1$, a volume resistivity of the adhesive 4 is $\rho_1$, a thickness of the insulating film 3 is $L_2$, a volume resistivity of the insulating film 3 is $\rho_2$, and $A_1$, A, $L_1$, $\rho_1$, $L_2$ and $\rho_2$ meet a following relationship:

$$\frac{\frac{L_1}{A_1}\cdot\rho_1\cdot\frac{L_2}{A-A_1}\cdot\rho_2}{\frac{L_1}{A_1}\cdot\rho_1+\frac{L_2}{A-A_1}\cdot\rho_2} \geq 10 \text{ M}\Omega. \quad (1)$$

Because the insulating film 3 is provided with the opening 31, a portion of the adhesive 4 bonds the case 21 of the battery 2 to the box body 1 at the opening 31, a portion of the adhesive 4 bonds the insulating film 3 to the box body 1 at the outside of the opening 31, it ensures the bonding strength between the battery 2 and the box body 1. Meanwhile, because A, $L_1$, $\rho_1$, $L_2$, $\rho_2$ and the area $A_1$ of the opening 31 of the insulating film 3 meet the above relationship, it makes a covering area of the insulating film 3 on the battery 2 meet the requirement of the insulating strength (that is, the insulation failure of the inside of the battery box does not occur), thereby ensuring the safety performance of the battery box.

For the relationship (1), let $$F = \frac{\frac{L_1}{A_1}\cdot\rho_1\cdot\frac{L_2}{A-A_1}\cdot\rho_2}{\frac{L_1}{A_1}\cdot\rho_1+\frac{L_2}{A-A_1}\cdot\rho_2},$$

that is F≥10MΩ.

It should be noted that, the larger the value of F is, the greater the insulating strength of the battery box is, and in order to meet the higher requirement of the insulating strength, it can reasonably set the values of $A_1$, A, $L_1$, $\rho_1$, $L_2$ and $\rho_2$ by the relationship (1) to increase the value of F, in turn attain the purpose of further improving the safety performance of the battery box, greatly reduce the cost of design and improve the production efficiency. Specifically, F≥150MΩ, that is $$\frac{\frac{L_1}{A_1}\cdot\rho_1\cdot\frac{L_2}{A-A_1}\cdot\rho_2}{\frac{L_1}{A_1}\cdot\rho_1+\frac{L_2}{A-A_1}\cdot\rho_2} \geq 150 \text{ M}\Omega.$$

The bonding strength of the case 21 of the battery 2 bonded to the box body 1 by the adhesive 4 is related to an amount of the adhesive 4, and the amount of the adhesive 4 is related to the area $A_1$ of the opening 31 of the insulating film 3, thus in order to ensure the requirement of the bonding strength of the battery box, preferably, $A_1$ and A need to meet the relationship: $A_1/A>50\%$.

Meanwhile, because of the structure of the battery 2 itself (i.e., rounded corners are formed at the four corners of the bottom of the battery 2), when the area $A_1$ of the opening 31 of the insulating film 3 is too large, the risk of insulation failure between the rounded corners of the two adjacent batteries 2 is increased. Therefore, in order to reduce the risk of insulation failure of the battery 2, preferably, $A_1$ and A need to meet the relationship: $A_1/A \leq 70\%$.

Because a high polymer material such as polypropylene (abbreviated as PP), polycarbonate (abbreviated as PC) or polyethylene terephthalate (abbreviated as PET) has larger volume resistivity (approximate $10^{14}$ Ω·cm) and good insulation performance, the insulating film 3 can be made of one of the above high polymer materials, and at this time $0.1\times10^{14}$ Ω·cm≤$\rho_2$≤$2\times10^{14}$ Ω·cm.

It should be noted that, the larger the thickness $L_1$ of the adhesive 4 is, it is more favorable to the bonding strength of the battery box, but when $L_1$ is too large, the insulation strength of the battery box is weakened in some extent. Therefore, in order to ensure the bonding strength and the insulating strength of the battery box at the same time, preferably, $0<L_1\leq2$ mm.

Because the insulating film 3 covers the outside of the case 21 of the battery 2, and when the thickness $L_2$ of the insulating film 3 is too large, the assembled size of the battery 2 will be increased, it is beneficial to improve the energy density of the battery box; and when the thickness $L_2$ of the insulating film 3 is too small, the bonding strength of the battery box cannot be guaranteed. Therefore, preferably, $0<L_2 \leq 0.15$ mm.

In order to ensure the bonding strength between the adhesive 4 and the case 21 of the battery 2 and the bonding strength between the adhesive 4 and the insulating film 3, in one embodiment, the material of the adhesive 4 may be a one-component polyurethane or a two-component polyurethane. A volume resistivity of the polyurethane in the initial state is $10^{10}$ Ω·cm, and the volume resistivity of the polyurethane will be increased over time (specifically, as shown in the flowing Table S-1, the unit is Ω·cm) during use, until the polyurethane reaches a fully cured state (at this time, the volume resistivity of the polyurethane is $10^{12}$ Ω·cm).

TABLE S-1

|   | 30 min | 1 h | 6 h | 1 day | 5 day | 7 day |
|---|---|---|---|---|---|---|
| 1 | 4.31361E+10 | 8.11E+11 | 1.37028E+12 | 2.11023E+12 | 7.3858E+12 | 1.91839E+12 |
| 2 | 4.54362E+10 | 5.07E+11 | 8.57464E+11 | 1.32049E+12 | 4.62173E+12 | 1.20045E+12 |
| 3 | 2.04057E+10 | 4.88E+11 | 8.24205E+11 | 1.26928E+12 | 4.44246E+12 | 1.15389E+12 |
| 4 | 7.670895E+10 | 8.90E+11 | 1.50425E+12 | 2.31655E+12 | 8.10791E+12 | 2.10595E+12 |
| 5 | 5.24595E+10 | 4.37E+11 | 7.3877E+11 | 1.13771E+12 | 3.98197E+12 | 1.03428E+12 |

For the adhesive 4 made of the one-component polyurethane, the bonding strength can be achieved by moisture curing or heat curing. For the adhesive 4 made of the two-component polyurethane, the bonding strength can be achieved by chemical bond and intermolecular force, and the bonding principle of the two-component polyurethane is specifically described below.

The two-component polyurethane includes a component containing the —NCO group (such as single-isocyanate or multi-isocyanate) and a polyol-component containing the —OH group, and the component containing the —NCO group and the polyol-component containing the —OH group form the two-component polyurethane under a catalyst. The curing manner of the two-component polyurethane is as follows:

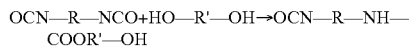

The intermolecular force of the two-component polyurethane refers to a van der waals force between molecules, a hydrogen bond formed between a substrate (the substrate comprises the case 21 of the battery 2 and the insulating film 3) and the cured —NH— group, or a hydrogen bond formed between the substrate and the cured —OH group. The chemical bond refers to a covalent bond formed among the OCN—R—NCO not cured into the crosslinked network, a trace water on the surface of the substrate and the metal oxide. Moreover, in achieving the bonding strength of the adhesive 4, the intermolecular force of the two-component polyurethane plays a major role, and the chemical bond plays an auxiliary role.

In addition, it should be noted that, in the preparing process of the two-component polyurethane, the following two aspects should be noted: (1) because a part of —NCO can be consumed when it reacts with water and produces an urea group, the content of —NCO should be higher than the content of —OH; (2) although the higher the content of —NCO is, the more intermetallic covalents are formed, the better the bonding strength is, however when the content of —NCO is too high, the adhesive may be excessively hardened and become brittle, or even the state the colloid is not cured occurs. Therefore, a molar ratio between —NCO and —OH needs to be maintained within a certain range in the ratio preparing of the two-component polyurethane.

In order to ensure the bonding strength between the adhesive 4 and the case 21 of the battery 2 and the bonding strength between the adhesive 4 and the insulating film 3, in another embodiment, the material of the adhesive 4 may be a one-component epoxy resin or a two-component epoxy resin. A volume resistivity of the epoxy resin in the initial state is 108 Ω·cm, and the volume resistivity of the epoxy resin will be increased over time (specifically, as shown in the flowing Table S-2, the unit is Ω·cm) during use, until the epoxy resin reaches a fully cured state (at this time, the volume resistivity of the epoxy resin is $10^{13}$ Ω·cm).

TABLE S-2

|   | 30 min | 1 h | 6 h | 1 day | 5 day | 7 day |
|---|---|---|---|---|---|---|
| 1 | 3.507E+08 | 6.59E+09 | 5.69780E+10 | 2.69850E+12 | 3.96800E+13 | 4.51000E+13 |
| 2 | 3.694E+08 | 4.13E+09 | 5.11200E+10 | 3.33600E+12 | 4.69800E+13 | 6.98000E+13 |
| 3 | 1.659E+08 | 3.97E+09 | 1.36900E+10 | 3.14560E+12 | 2.33390E+13 | 7.98500E+13 |
| 4 | 6.2365E+08 | 7.24E+09 | 3.66600E+10 | 2.69700E+12 | 2.99800E+13 | 2.36900E+13 |
| 5 | 4.265E+08 | 3.55E+09 | 4.00100E+10 | 5.55600E+12 | 1.99800E+13 | 5.56500E+13 |

For the adhesive 4 made of the one-component epoxy resin, the bonding strength can be achieved by moisture curing or heat curing. For the adhesive 4 made of the two-component epoxy resin, the bonding strength can be achieved by chemical bond and intermolecular force, and the bonding principle of the two-component epoxy resin is specifically described below.

The two-component epoxy resin includes a component containing an epoxy group and a component containing the —OH group and the —NH$_2$ group, and the component containing an epoxy group and the component containing the —OH group and the —NH$_2$ group to form the two-component epoxy resin under a catalyst. The curing manner of the two-component epoxy resin is as follows:

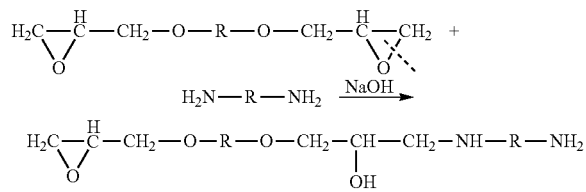

The intermolecular force of the two-component epoxy resin refers to a van der waals force formed between molecules, a hydrogen bond formed between the substrate and the epoxy group, a hydrogen bond formed between the substrate and the —OH group, a hydrogen bond formed between the substrate and the —NH$_2$ group, or a hydrogen bond formed between the substrate and the —O-ether group. The chemical bond refers to a covalent bond formed by the component contained the —NH$_2$ group, a trace water on the surface of the substrate and the metal oxide, and a covalent bond formed by the component containing the epoxy group, a trace water on the surface of the substrate and the metal oxide during the ring opening process.

It should be noted that, because the molecules of the epoxy resin may be an additive reaction in the process of crosslinking, water and volatile product will not be generated, the overall curing shrinkage rate is low, the bulk strength is high, thereby achieving a strong bonding strength.

In the present disclosure, in one test case, there were 20 test groups respectively formed by four adhesives 4 (defined as 1#, 2#, 3# and 4#, and 1#-4# adhesives were made of epoxy resin, the 1# adhesive was in the state that epoxy resin was at 30 min, 2 # adhesive was in the state that epoxy resin was at 1 h, 3# adhesive was in the state that epoxy resin was at 1 day, 4# adhesive was in the state that epoxy resin was at 5 day) and the five different area ratios of the opening 31 of the insulating films 3 ($L_1$=0.5 mm, $L_2$=0.11 mm), the corresponding value of F in each test group was calculated by using relationship (1), and the specific test results were as the following Table S-3:

TABLE S-3

| test group | | the area ratio of the opening $A_1/A$ | the value of F | | the test results |
|---|---|---|---|---|---|
| 1# adhesive | 1-1 | 50% | 2000 | Ω | failure |
| | 1-2 | 40% | 2500 | Ω | failure |
| | 1-3 | 30% | 3300 | Ω | failure |

TABLE S-3-continued

| test group | | the area ratio of the opening $A_1/A$ | the value of F | | the test results |
|---|---|---|---|---|---|
| | 1-4 | 20% | 5000 | Ω | failure |
| | 1-5 | 10% | 10000 | Ω | failure |
| 2# adhesive | 2-1 | 50% | 0.2 | MΩ | failure |
| | 2-2 | 40% | 0.25 | MΩ | failure |
| | 2-3 | 30% | 0.33 | MΩ | failure |
| | 2-4 | 20% | 0.5 | MΩ | failure |
| | 2-5 | 10% | 1 | MΩ | failure |
| 3# adhesive | 3-1 | 50% | 19.8 | MΩ | pass |
| | 3-2 | 40% | 24.6 | MΩ | pass |
| | 3-3 | 30% | 32.6 | MΩ | pass |
| | 3-4 | 20% | 48.1 | MΩ | pass |
| | 3-5 | 10% | 91.7 | MΩ | pass |
| 4# adhesive | 4-1 | 50% | 182 | MΩ | pass |
| | 4-2 | 40% | 217 | MΩ | pass |
| | 4-3 | 30% | 270 | MΩ | pass |
| | 4-4 | 20% | 357 | MΩ | pass |
| | 4-5 | 10% | 526 | MΩ | pass |

According to Table S-3, for the test groups formed by 1# adhesive and the test groups formed by 2# adhesive, the values of F calculated by using relationship (1) were all smaller than 10MΩ, and the test groups had failed the insulation test; for the test groups formed by 3# adhesive and the test groups formed by 4# adhesive, the values of F calculated by using relationship (1) were all greater than 10MΩ, and the test groups had passed the insulation test.

In the present disclosure, in another test case, there were twenty test groups respectively formed by four adhesives 4 (defined as 5#, 6#, 7# and 8#, and the adhesives 5#-8# were made of polyurethane, 5# adhesive was in the state that polyurethane was at 30 min, 6# adhesive was in the state that polyurethane was at 1 h, 7# adhesive was in the state that polyurethane was at 1 day, 8# adhesive was in the state that polyurethane was at 5 day) and the five different area ratios of the opening 31 of the insulating films 3 ($L_1$=0.5 mm, $L_2$=0.11 mm), the corresponding value of F in each test group was calculated by using relationship (1), and the specific test results were as the following Table S-4.

TABLE S-4

| test group | | the area ratio of the opening $A_1/A$ | the value of F | | the test results |
|---|---|---|---|---|---|
| 5# adhesive | 5-1 | 50% | 0.182 | MΩ | failure |
| | 5-2 | 40% | 0.227 | MΩ | failure |
| | 5-3 | 30% | 0.3032 | MΩ | failure |
| | 5-4 | 20% | 0.454 | MΩ | failure |
| | 5-5 | 10% | 0.908 | MΩ | failure |
| 6# adhesive | 6-1 | 50% | 1.82 | MΩ | failure |
| | 6-2 | 40% | 2.27 | MΩ | failure |
| | 6-3 | 30% | 3.02 | MΩ | failure |
| | 6-4 | 20% | 4.53 | MΩ | failure |
| | 6-5 | 10% | 9.01 | MΩ | failure |
| 7# adhesive | 7-1 | 50% | 18.7 | MΩ | pass |
| | 7-2 | 40% | 22.4 | MΩ | pass |
| | 7-3 | 30% | 29.6 | MΩ | pass |
| | 7-4 | 20% | 43.7 | MΩ | pass |
| | 7-5 | 10% | 83.4 | MΩ | pass |
| 8# adhesive | 8-1 | 50% | 1.98 | GΩ | pass |
| | 8-2 | 40% | 4.25 | GΩ | pass |
| | 8-3 | 30% | 3.55 | GΩ | pass |
| | 8-4 | 20% | 6.99 | GΩ | pass |
| | 8-5 | 10% | 8.80 | GΩ | pass |

According to Table S-4, for the test groups formed by 5# adhesive n and the test groups formed by 6# adhesive, the values of F calculated by using relationship (1) were all smaller than 10MΩ, and the test groups had failed the insulation test; for the test groups formed by 7# adhesive and the test groups formed by 8# adhesive, the values of F calculated by using relationship (1) were all greater than 10MΩ, and the test groups had passed the insulation test.

Therefore, as could be seen from the above test cases, the insulation strength of the battery box could be directly obtained by the relationship (1) in the subsequent structural design of the battery box, and there was no need for measurement by using an insulation withstanding voltage tester, thereby greatly reducing the cost and improving the production efficiency.

What is claimed is:

1. A battery box, comprising:
   a box body;
   a plurality of batteries being arranged side by side in a longitudinal direction and accommodated in the box body, and each battery comprising a case;
   an insulating film covering and fixed to an outside of the case of each battery, and an opening being provided on the insulating film to make a corresponding portion of the case expose to the insulating film; and
   an adhesive provided between the battery and the box body and used to fix each battery to the box body;
   wherein
   an area of the opening is $A_1$, a total area of a surface of the case corresponding to the opening is A, a thickness of the adhesive is $L_1$, a volume resistivity of the adhesive is $\rho_1$, a thickness of the insulating film is $L_2$, a volume resistivity of the insulating film is $\rho_2$, and $A_1$, A, $L_1$, $\rho_1$, $L_2$ and $\rho_2$ meet a following relationship:

$$\frac{\frac{L_1}{A_1} \cdot \rho_1 \cdot \frac{L_2}{A - A_1} \cdot \rho_2}{\frac{L_1}{A_1} \cdot \rho_1 + \frac{L_2}{A - A_1} \cdot \rho_2} \geq 10 \text{ M}\Omega.$$

2. The battery box according to claim 1, wherein $$\frac{\frac{L_1}{A_1} \cdot \rho_1 \cdot \frac{L_2}{A - A_1} \cdot \rho_2}{\frac{L_1}{A_1} \cdot \rho_1 + \frac{L_2}{A - A_1} \cdot \rho_2} \geq 150 \text{ M}\Omega.$$

3. The battery box according to claim 1, wherein $A_1$ and A need to meet the relationship: $A_1/A > 50\%$.

4. The battery box according to claim 1, wherein $A_1/A \leq 70\%$.

5. The battery box according to claim 1, wherein the insulating film is made of polypropylene, polycarbonate or polyethylene terephthalate, and $0.1 \times 10^{14}$ Ω·cm $\leq \rho_2 \leq 2 \times 10^{14}$ Ω·cm.

6. The battery box according to claim 1, wherein $0 < L_1 \leq 2$ mm.

7. The battery box according to claim 1, wherein $0 < L_2 \leq 0.15$ mm.

8. The battery box according to claim 1, wherein the material of the adhesive is a one-component polyurethane or a two-component polyurethane.

9. The battery box according to claim 1, wherein the material of the adhesive is a one-component epoxy resin or a two-component epoxy resin.

10. The battery box according to claim 1, wherein
    the case of each battery comprises a bottom face;
    the opening is positioned below the bottom face of the case in an up-down direction and makes a part of the bottom face of the case expose to the insulating film.

11. The battery box according to claim 1, wherein
    the case of each battery comprises a side face;
    the opening is positioned outside the side face of the case in a transversal direction and makes a part of the side face of the case expose to the insulating film.

12. A vehicle, comprising a battery box, wherein
    the battery box comprises a box body, a plurality of batteries, an insulating film and an adhesive;
    the plurality of batteries is arranged side by side in a longitudinal direction and accommodated in the box body, and each battery comprises a case;
    the insulating film covers and is fixed to an outside of the case of each battery, and an opening is provided on the insulating film to make a corresponding portion of the case expose to the insulating film;
    the adhesive is provided between the battery and the box body and used to fix each battery to the box body;
    wherein an area of the opening is $A_1$, a total area of a surface of the case corresponding to the opening is A, a thickness of the adhesive is $L_1$, a volume resistivity of the adhesive is $\rho_1$, a thickness of the insulating film is $L_2$, a volume resistivity of the insulating film is $\rho_2$, and $A_1$, A, $L_1$, $\rho_1$, $L_2$ and $\rho_2$ meet a following relationship:

$$\frac{\frac{L_1}{A_1} \cdot \rho_1 \cdot \frac{L_2}{A - A_1} \cdot \rho_2}{\frac{L_1}{A_1} \cdot \rho_1 + \frac{L_2}{A - A_1} \cdot \rho_2} \geq 10 \text{ M}\Omega.$$

13. The vehicle according to claim 12, wherein $$\frac{\frac{L_1}{A_1} \cdot \rho_1 \cdot \frac{L_2}{A - A_1} \cdot \rho_2}{\frac{L_1}{A_1} \cdot \rho_1 + \frac{L_2}{A - A_1} \cdot \rho_2} \geq 150 \text{ M}\Omega.$$

14. The vehicle according to claim 12, wherein $A_1$ and A need to meet the relationship: $A_1/A > 50\%$.

15. The vehicle according to claim 12, wherein $A_1/A \leq 70\%$.

16. The vehicle according to claim 12, wherein
    the insulating film is made of polypropylene, polycarbonate or polyethylene terephthalate, and $0.1 \times 10^{14}$ Ω·cm $\leq \rho_2 \leq 2 \times 10^{14}$ Ω·cm.

17. The vehicle according to claim 12, wherein $0 < L_1 \leq 2$ mm.

18. The vehicle according to claim 12, wherein $0 < L_2 \leq 0.15$ mm.

19. The vehicle according to claim 12, wherein the material of the adhesive is a one-component polyurethane or a two-component polyurethane.

20. The vehicle according to claim 12, wherein the material of the adhesive is a one-component epoxy resin or a two-component epoxy resin.

* * * * *